Nov. 8, 1960 G. V. MUMFORD ET AL 2,958,907
METHOD OF PRODUCING INSULATING CONTAINERS
Filed April 1, 1957 5 Sheets-Sheet 1

INVENTORS
GEORGE V. MUMFORD
LEONARD D. SOUBIER
BY W. A. SCHAICH
LEONARD D. SOUBIER
ATTORNEYS

Nov. 8, 1960  G. V. MUMFORD ET AL  2,958,907
METHOD OF PRODUCING INSULATING CONTAINERS
Filed April 1, 1957  5 Sheets-Sheet 2
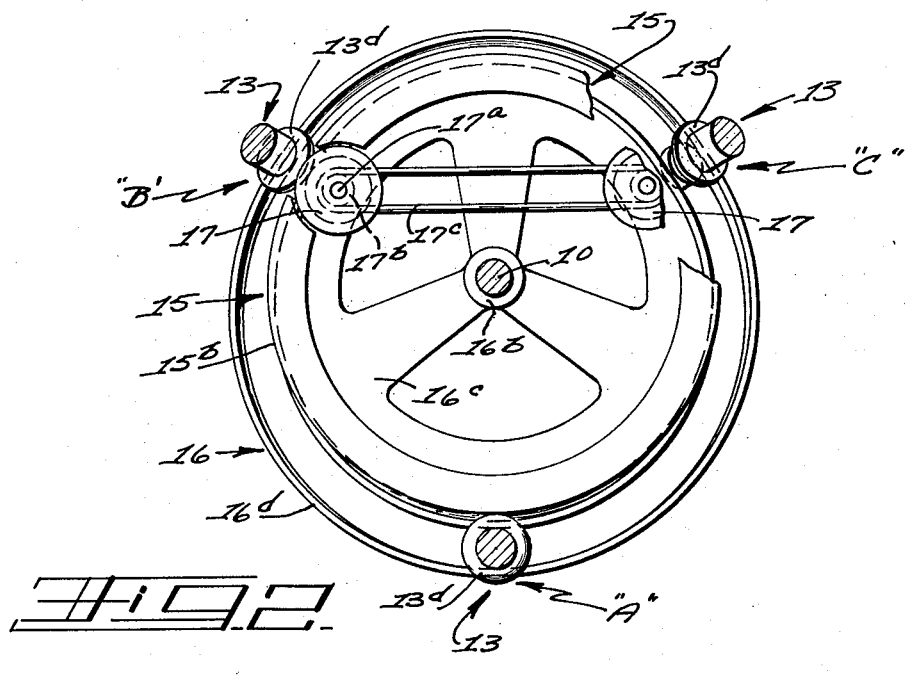
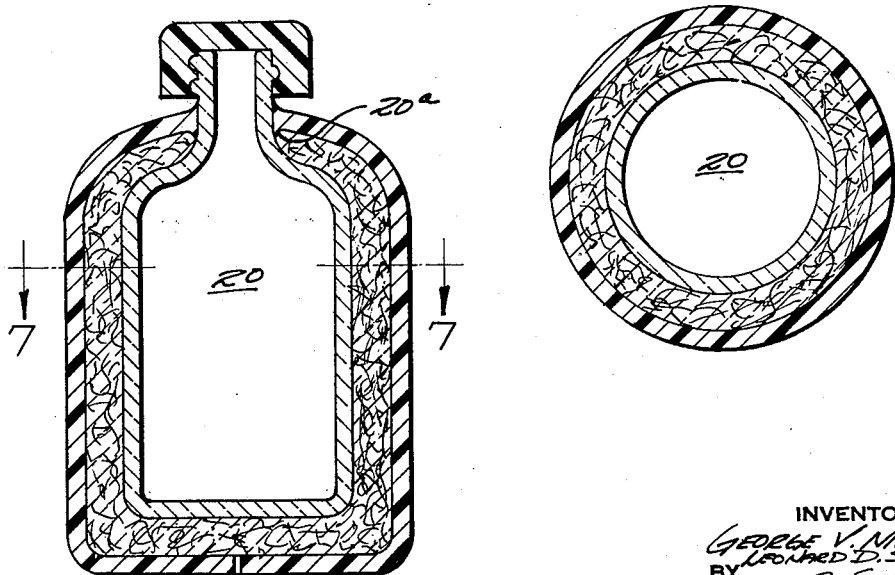
INVENTORS
GEORGE V. MUMFORD
LEONARD D. SOUBIER
BY W. A. SCHAICH
LEONARD D. SOUBIER
ATTORNEYS

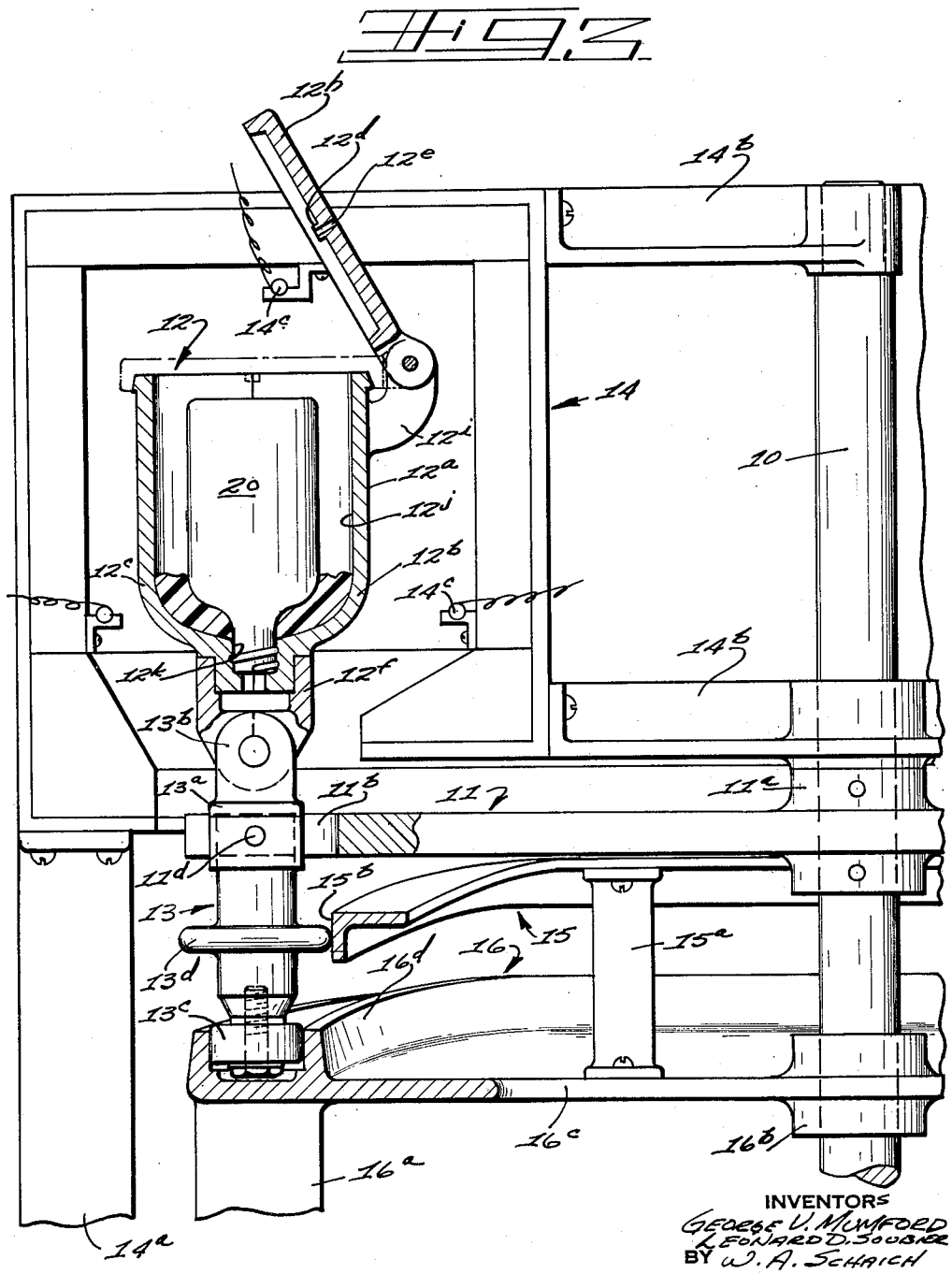

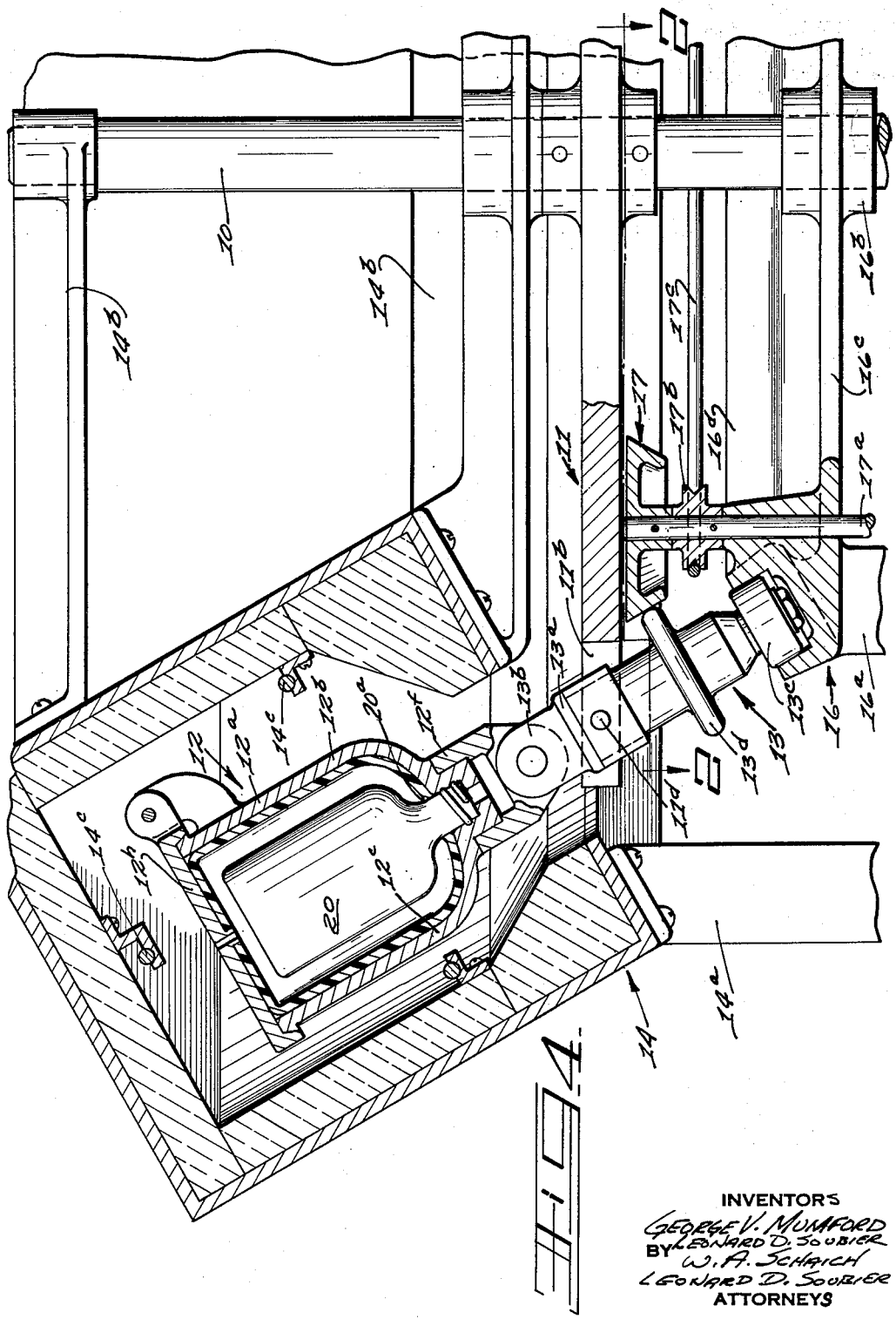

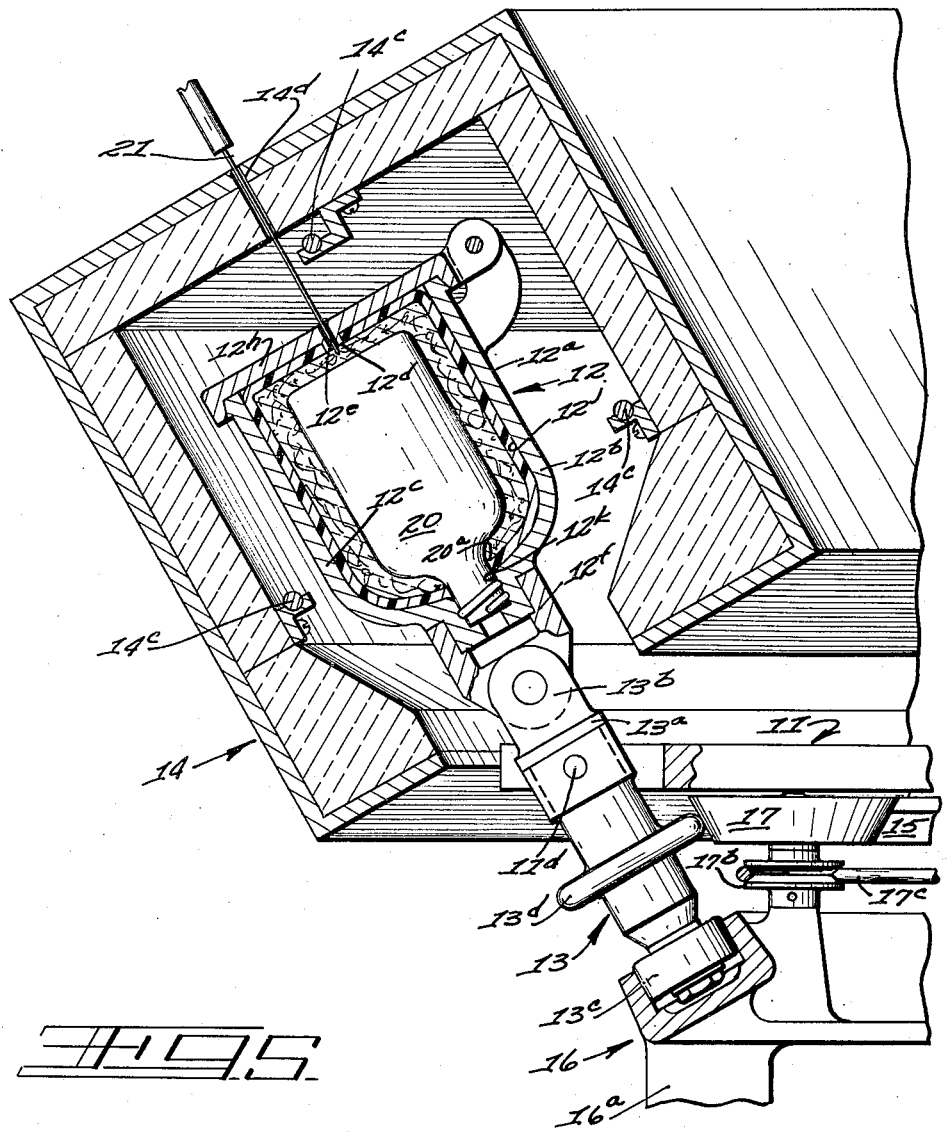

United States Patent Office 2,958,907
Patented Nov. 8, 1960

2,958,907
METHOD OF PRODUCING INSULATING CONTAINERS

George V. Mumford and Leonard D. Soubier, Toledo, Ohio, assignors to Owens-Illinois Glass Company, a corporation of Ohio Filed Apr. 1, 1957, Ser. No. 650,037
6 Claims. (Cl. 18—59)

This invention relates to an improved method for insulating containers such as bottles, jars, flasks, and the like with a jacket of thermal insulating material.

Containers such as the above are adaptable to a wide variety of uses, particularly for packaging materials which are to be maintained in a refrigerated or heated condition for appreciable periods of time. Heretofore, such types of insulated containers have commonly been referred to as thermos bottles, and have customarily been constructed in the form of a vacuumized double-walled container, the vacuumized double wall serving to reduce heat transmission between the contents of the container and the atmosphere. A principal disadvantage of these double-walled containers, however, is that they are characteristically constructed with very thin and fragile walls which are readily broken when the container is subjected to a slight impact, such as is frequently occasioned when the thermos bottle is accidentally dropped or bumped against a hard object.

A container designed to overcome many of the disadvantages of these conventional double-walled type thermos bottles including the great disadvantage of fragility has been described in the copending patent application of Robert T. Wallace, Serial No. 610,594, filed September 18, 1956, and assigned to the assignee of this invention. In the referred to copending application, there is described a container which is preferably constructed from a glass or plastic material upon which a layer of an integrated cellular plastic insulation is formed. The cellular plastic insulation is preferably a polyurethane type material, and has been found to impart to the container a high degree of resistance to impact as well as to thermal transmission.

The present invention is directed to a novel method suited to produce on a production basis a container similar to that described in the referred to copending application; and, accordingly, one object of this invention is the use of an automatic machine for insulating containers with a cellular plastic material in a manner commensurate with modern production techniques.

Another object of this invention is to provide a method whereby a jacket of thermal insulating material, comprising a foamed plastic layer, may be formed around a container in such manner as to provide the container with improved characteristics of resistance to thermal transmission and breakage.

Another object of this invention is to provide a method for forming a jacket of insulating material around a container, wherein the jacket so formed comprises a plastic shell surrounding the container and forming a protective covering over a layer of foamed or cellular plastic insulating material disposed intermediate the container and the shell; and, wherein the method is adapted to produce such a jacket of insulating material rapidly and economically.

A particular object of this invention is to provide a method for forming a jacket of insulating material around successive containers in rapid sequence, which method comprises placing the containers in successive molds, and forming a jacket of insulation thereon by depositing a quantity of a foamable liquid plastic material around the containers in the molds, and rotating the molds about several axes while said foamable material is being formed.

The specific nature of this invention, as well as other objects and advantages thereof, will become apparent to those skilled in the art from the following detailed description, taken in conjunction with the annexed drawings on which, by way of preferred example only a preferred embodiment of this invention is illustrated.

Referring now to the accompanying drawings:

Fig. 2 is a sectional plan view of the same machine, the section being taken along the line 2—2 in Fig. 4 for the purpose of showing the organization of various members providing motion to the molds.

Figs. 3–5 are enlarged, centrally sectioned, elevational views, showing a mold and associated apparatus as they will appear at progressive intervals during the formation of an insulated container, and corresponding to positions attained during the advancement of the molds from station to station.

Fig. 6 is an elevational view in central section, illustrating a container having a jacket of insulating material formed thereon in accordance with the method set forth in this invention.

Fig. 7 is a sectional view taken along the line 7—7 in Fig. 6, showing the general cross-sectional configuration of the container so produced.

Figure 1:
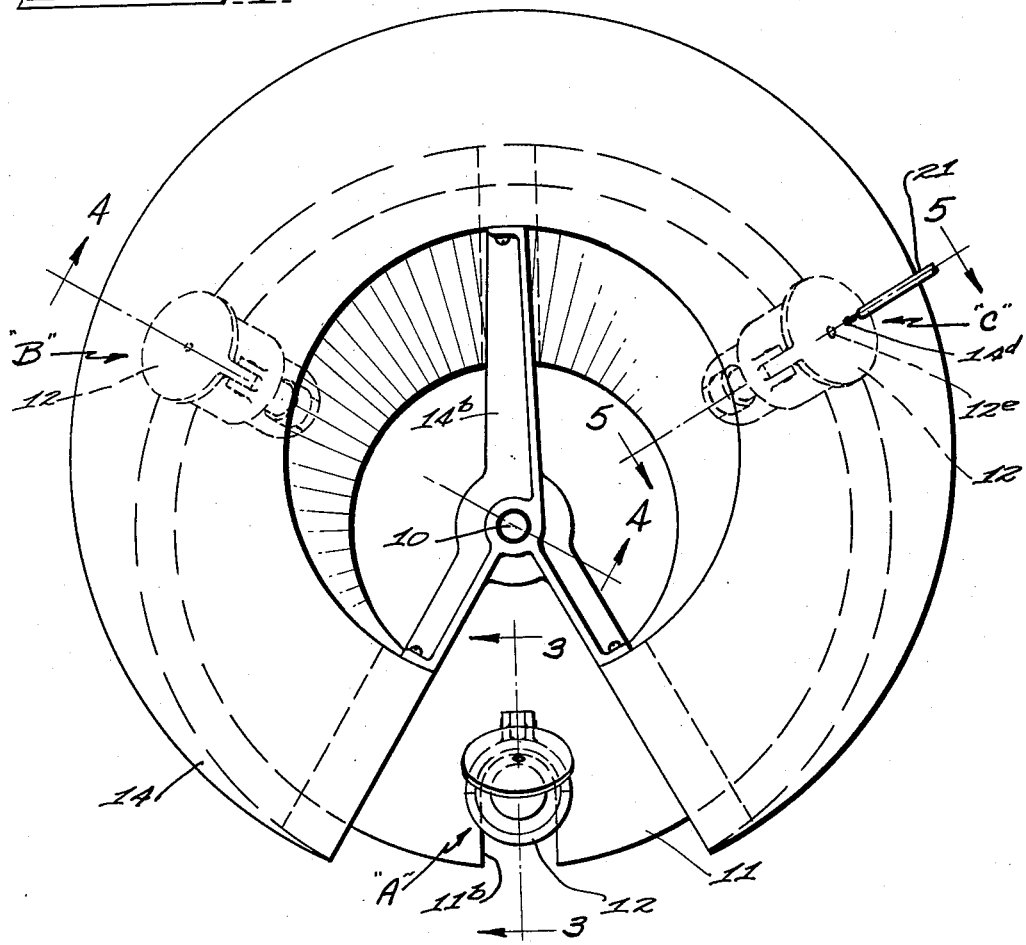
Fig. 1 is a plan view of a machine embodying apparatus suitable for carrying out this invention, including a series of molds mounted on the machine.

Referring to Fig. 1, the apparatus for carrying out this invention comprises, generally, a horizontal rotatable table 11, upon which a series of hollow molds 12 is mounted in marginally spaced relationship at locations corresponding to operating stations as indicated by A, B, and C. The said table is actuated by suitable machinery which transmits clockwise rotational movement thereto to bring the molds successively to said stations. The mounting arrangement of the molds is such that, in addition to being rotatable in the above manner in an orbital path and as a series, each mold is individually rotatable about a pivotable or shiftable axis. Overlying the table and molds there is a stationary hood 14 through which the molds are advanced and which may be provided in its interior with either heating or cooling means, the alternative between heating or cooling means being dependent upon the properties of the material to be molded.

With reference next to Fig. 2, it will be observed that there is situated in fixed position beneath the table, a bi-sectional cam rail 15 along which means formed on each mold travels or rolls to thereby transmit individual rotational movement to each mold as the table is rotated. Also situated in fixed position beneath the table is a cam track 16, which cooperates with guide means attached to the lower end of each mold to gradually shift each mold's individual axis of rotation from a substantially vertical position at station A to an oblique or tilted position at stations B and C. The correlation between the cam rail and the cam track is such that they cooperate to separately rotate each individual mold while the axis of rotation is concurrently shifted between such vertical and oblique positions. At stations B and C, the ends of the cam rail sections are spaced apart, and there is positioned in each of the spaces a rotatable drive plate 17 which contacts each mold as it is transferred from one section of the cam rail to the other.

Describing the machine in greater detail, there is illustrated in Fig. 3 an upright center column 10 which is suitably mounted for clockwise rotational movement about its vertical axis, such rotational movement solely for descriptive purposes herein being sequential and being provided by a conventional indexing apparatus, which does not constitute part of this invention. The table 11 is mounted on the center column for rotation therewith, such mounting being provided by means of a hub 11a, integrally formed in the center of the table and through which the center column is fixedly journalled. Pins extending transversely through the hub and engaging the center column are also preferably utilized to prevent relative movement between the center column and table. Defined in the periphery of the table there is a series of spaced slots 11b which are so located that they will individually register with each of the stations A, B, and C, each time the table is indexd. Although three such slots are illustrated, it will become obvious from the following description that the number of such slots is limited only by practicality, and more or less slots and, hence, molds, may be utilized.

The molds 12 each comprise a hollow body portion 12a and a lower extension 13, and are distributed in such manner that a single mold is mounted in each of the slots 11b for individual, rotational and pivotal movement with the body portion being supported above the surface of the table and the extension depending downward below the table.

Each extension 13 comprises an integral shoulder 13a supported upon a mounting arrangement provided in each slot 11b in the table, and includes a yoke 13b formed on its uppermost axial end, and guide means such as an independently rotatable guide bearing 13c bolted to its lowermost end. Also included as an integral part of the extension is a fixed concentric roller 13d. The guide bearing and roller cooperate with the cam track 16 and cam rail 15, respectively, in a manner to be subsequently described in detail, to transmit individual rotational and pivotal or tilting movement to each mold.

Figure 8:
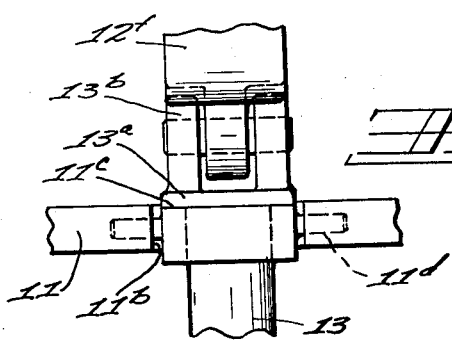
Fig. 8 is an elevational view illustrating the typical mounting arrangement of the molds.

Referring to Fig. 8, the mounting arrangement of each mold permitting such individual rotational and pivotal movement includes a collar bearing 11c, through which the extension 13 is slidably journalled for rotational movement, and upon which the shoulder 13a, formed on the extension, gravitationally seats. A pair of radial arms 11d extend laterally outward from the collar bearing and are journalled into opposite sides of the slot, which may be provided with conventional roller bearings, not shown, to permit the arms to turn about their longitudinal axis and, hence, to permit the collar bearing to pivot.

The body portion 12a of each mold is preferably of split construction, being divided lengthwise into mating half-sections 12b and 12c, which are reduced in size at their lower ends and clamped in separable jaws 12f which are, in turn, connected to the yoke 13b on the extension to maintain the body portion and the extension in fixed, coaxial relationship. Means for closing each mold is provided by a lid 12h, pivotally connected to an arcuate arm 12i, mounted upwardly from the side of the body portion 12a. Included as an integral part of the lid, there is formed on the underside thereof a central boss 12d, in which there is defined a central aperture 12e which extends transversely through the lid. The interior of the body portion defines a molding surface 12j, which is substantially larger than, and generally conforms to the shape of the container to be insulated therein. The molding surface is gradually rounded at the lower end of the mold, and converges toward the center thereof, and merges with an axial bore 12k formed in the end of the mold which clamps around the neck portion of a container to position and to support the container coaxially within the mold. As illustrated, the bore is threaded to conform to the threaded neck portion of the container.

The cam track 16 is supported horizontally beneath the table upon rigidly mounted, vertical legs 16a, and comprises a central hub 16b which is freely centered on the center column to align the cam track in its proper relationship with the other apparatus. Radial spokes 16c connect the central hub with a channel 16d, formed on the upper marginal surface of the cam track. The location of the channel is such that the mold guide bearings 13c seatably roll therein as the table is rotated from station to station. Additionally, the channel is twisted so as to pitch gradually outward from a generally upright position at station A, as illustrated in Fig. 3, to an oblique or tilted position at station B, as illustrated in Fig. 4. The tilted position of the channel is continuous from station B to station C, after which the channel gradually pitches back toward a vertical position again at station A. Hence, as the guide bearings roll along in the channel, they tilt the molds from a substantially vertical position at station A to a tilted position at and from station B to station C, and back again to a vertical position at station A.

The bi-sectional cam rail 15 is supported intermediate the cam track and the table upon struts 15a, which are mounted upwardly from the radial cam track spokes 16c and bolted to the underside of the cam rail. The cam rail sections are shaped to conform to the path through which the molds are rotated by the table, and define a peripheral surface 15b, which contacts the rollers 13d as the molds are rotated by the table, and causes the rollers, through its frictional contact therewith, to roll and transmit rotational movement through the extension 13 to the body portion 12 of the mold. Additionally, to permit the rollers to remain in contact therewith as the molds are tilted, the peripheral surface is gradually sloped to correspond to the pitch of that portion of the channel 16d which is positioned immediately beneath.

The circular drive plates 17, which are identical in construction, each have a central hub through which is fixedly journalled a vertical shaft 17a mounting a pulley 17b. Suitable mechanism such as the drive shaft of a conventional motor, not illustrated, may be connected to the vertical shaft of one of the drive plates and provide rotational movement thereto, which is then transmitted to the other drive plate by an endless belt 17c trained over the pulleys of each respective shaft. The positioning of the drive plates between the ends of the cam rail sections at stations B and C permits the periphery of each of the drive plates to contact each roller 13d as it travels from one section of the cam rail to the other, and while the molds are momentarily interrupted in their orbital movement during the interval of time between successive indexing of the table. In this manner, the molds may be individually rotated at stations B and C while the table remains stationary to permit the necessary operations or method steps of this invention to be performed.

The hood 14 is mounted on rigid, upright legs 14a and provided with stationary radial arms 14b, connected through roller bearings to the center column to provide lateral stability to the hood. The hood defines a C-shaped configuration throughout its length, which conforms to the closed orbital path of rotation of the molds to permit them to travel therethrough as the table is sequentially rotated from station to station. Additionally, the hood is preferably thermally insulated and provided in its interior with conventional heating means, such as conventional electric heating elements 14c, which heat the molds as they pass therethrough. At station C, the top of the hood is provided with an opening 14d which is oriented to register with the aperture 12e in each mold lid.

In forming a jacket of insulating material around a container in accordance with the method steps of this invention and utilizing the aforedescribed apparatus, a container, herein illustrated as a bottle 20, is placed in inverted position within a mold positioned at station A, Fig. 3, and the neck of the bottle is clamped in threaded engagement with the threaded axial bore 12k. As illustrated, the container, with the exception of the neck portion, when so supported, occupies a position within the mold concentrically spaced from the molding surface 12j and spaced from the open end of the mold. While the mold is still at station A, a measured quantity of a heat-setting, fluid plastic material such as a liquid organosol or plastisol as, for example, a vinyl plastisol or the like, is introduced into the mold, the quantity of such material being sufficient when spread out to coat the molding surface and the underside of the lid 12h with a thin layer of liquid plastic. The lid is then closed and locked over the mold, and the table rotatively indexed in a clockwise direction toward station B.

As the table travels toward station B, rotating the mold in an orbital path, the frictional contact between the cam rail 15 and the roller 13d causes the roller to impart individual, rotational motion to the mold about its central axis which, meanwhile, is being shifted from a vertical position to a tilted or oblique position by the effect of the guide bearings riding in the cam track 16. The ultimate effect of the cumulative rotational and pivotal movements of the mold is to distribute the liquid plastic uniformly over the molding surface and underside of the lid. Concurrent with the distribution of the plastic, heating means 14c in the hood 14 heat the mold and cause the liquid plastic to gradually set-up and solidify upon contact with the heated molding surface.

When the table has advanced the mold to a position corresponding to station B, the rollers come into contact with the drive plate 17, and the advancement of the table is interrupted momentarily while operational steps are being performed at stations A and C. During the momentary interruption between indexings of the table, however, the mold is continuously rotated by the drive plate about its individual central axis which, at this location, is in a tilted position, such as that illustrated in Fig. 4. In this manner, the plastic material remains distributed and continues to solidify and form a thin shell of plastic material surrounding the bottle 20 and joined to the neck thereof as at 20a. After sufficient time has elapsed to permit the operations at stations A and C to be completed, the mold is indexed toward station C.

As the mold is thus advanced, the heating thereof is continued and the mold is transferred onto the second section of the cam rail, whereon it is individually rotated in the same manner as previously described with respect to its travel between stations A and B. Between stations B and C, however, the individual axis of rotation of the mold is maintained continuously in a tilted position corresponding substantially to the position previously indicated at station B.

Referring to Fig. 5, at station C, the movement of the table is again momentarily interrupted and the mold individually rotated about a tilted axis by the second one of the drive plates. While being individually rotated in this manner, a tubular injection stem 21, which is insertable through the opening 14d in the top of the hood and the central aperture 12e in the mold lid, is utilized to introduce a measured quantity of a foamable plastic material such as a liquid mixture of a foamable polyurethane type prepolymer, a tertiary amine catalyst, and water into the shell, the central boss 12d on the underside of the lid having served to mold an opening in the plastic shell through which the stem may pass without tearing the shell or pulling it away from the molding surface. After its introduction into the mold, the foamable plastic material is subjected immediately to the centrifugal action of the rotating mold and is uniformly distributed over the interior surface of the plastic shell concurrently with the generation of foam. The mold is then indexed toward station A.

A foamable plastic material found to be quite well suited to the present invention is one which is prepared commercially in a ready-to-mix foam by Isocyanate Products, Inc., Wilmington, Delaware, and marketed under the trademark "Isofoam." Alternatively, a foamable liquid comprising an aromatic diisocyanate, preferable toluene 2,4 diisocyanate, a polyol or polyester resin, a tertiary amine catalyst such as N-methylmorpholine, tripropylamine, or the like, and water might be utilized. Also, with certain modfications well known in the art, a foamable polystyrene or other foamable plastics having similar characteristics might be employed.

Upon leaving station C, the roller 13d again passes onto the cam rail and is rotated thereby, while the mold is concurrently lifted gradually back to its original vertical position and preferably heated to accelerate the curing or polymerization of the foamed plastic into an integrated cellular body possessing exceptional thermal insulating properties.

At station A, the lid is opened and the completed insulated container, as illustrated in Figs. 6 and 7 wherein a closure has been attached to the container for illustration only, is removed from the mold and replaced by another container to be processed in identical manner with that just described.

In the foregoing operation, the cycles employed and the temperatures utilized are matters which are necessarily dependent to a considerable extent upon the characteristics of the particular plastic materials utilized. For example, it is well known that certain types of plastic materials, after having been heated to a fused highly viscuous mass, must be then cooled in order to permit the fused mass to solidify. It is contemplated that in such cases, jets of cooling air positioned, for example, at station C and directed onto the mold prior to the introduction of the foamable plastic material, could be employed. Additionally, it is further contemplated that a completely reversible thermoplastic material, preferably having a narrow temperature range between its liquid and solid state, such as finely granulated nylon or polyethylene, might be employed, in which event conversion of the heating means 14c to cooling means could be readily performed.

It is likewise realized that in certain instances it may be desirable to form an insulated container without the plastic outer shell, and having only a foam plastic covering thereon. In such instances, the same general procedure and apparatus as that hereinbefore described may be employed but, obviously, the step of introducing a fluid plastic material into the mold, as at station A, would be omitted from the process. In such instances, to facilitate removal of the completed article, it is generally desirable to coat the interior surfaces of the mold with a suitable lubricant, and particularly is this true when a polyurethane type foamable material is employed. Alternatively, the mold may be fabricated from or coated with a plastic material such as a polymer of monochlorotrifluoroethylene or polytetrafluoroethylene, since it has been found that polyurethane foams are non-adherent to these materials. As polyurethane type materials foam and polymerize, they tend to adhere tenaciously to most materials and, consequently, without the plastic shell disposed between the foamed polyurethane and mold, removal of the completed insulated container oftentimes might be difficult, if the mold were not first properly conditioned in one of the manners just described. Such modifications as those just described are considered to be merely exemplary of some of the types of changes in the method as herein described which might be made within the scope of this invention.

Utilizing the method described, it is possible to produce a jacket of cellular plastic insulation around a container, which imparts a high degree of resistance to thermal transmission between the container contents and the atmosphere, plus a substantial degree of shock resistance which protects the container from being readily broken. Furthermore, it is possible to manufacture such insulated containers in a rapid and economical manner commensurate with modern production techniques.

Another advantage of the present invention is the uniform distribution of the foamable material over the surface of the plastic outer shell, which occurs immediately upon the introduction of the foamable material into the mold. As the foam generation commences, the foam, in the case of polyurethane type foams, concurrently undergoes a polymerization reaction which causes it to rigidify and adhere tenaciously to glass or most plastic substances. Obviously, then, as the foaming action proceeds, the foam first generated will tend to set up and restrict further generation of foam. For example, if the foamable liquid were introduced into the space between the container and plastic shell as described in the present invention at station C, and the rotation of the mold were eliminated, the foam would proceed to form at the bottom of the mold and adhere to the container and shell before the entire foaming action had ceased. As a consequence, the polymerized foam would tend to crack or pull away from the container and shell in order to permit further foaming of the liquid. In the present invention, this difficulty is overcome, inasmuch as the foam is distributed throughout the mold and over the surfaces of the plastic shell immediately upon its introduction into the mold. Hence, when the foaming commences, it proceeds generally throughout the entire molding space simultaneously and, hence, in order to accommodate the expanding foam, it is not necessary that the foam which is first to form and polymerize should yield and become subjected to cracking or tearing away from the container or shell.

It will, of course, be understood that various details of construction may be modified throughout a wide range without departing from the principles of this invention, and it is, therefore, not the purpose to limit the patent granted hereon otherwise than necessitated by the scope of the appended claims.

We claim:

1. A method of forming an insulated container which comprises nesting the body portion of a container in spaced relationship within a hollow molding member, thereby forming an annular space between said container and said molding member, introducing into the annular space a fluid plastic material capable of being foamed and immediately distributing the fluid plastic material over the interior surface of said hollow molding member to form a film thereon in a spaced relationship from the body portion of said container, and foaming and solidifying said fluid foamable plastic material, thereby filling said annular space with solidified foamed plastic.

2. A method of forming an insulated container, which comprises nesting the body portion of a container in spaced relationship within the confines of a larger, axially rotatable cavity mold, thereby forming an annular space between said mold and said container, depositing a quantity of fluid plastic material in said annular space, rotating said mold to thereby distribute said plastic as a film over the interior surface of said mold, solidifying said fluid plastic material on said interior surface to form a shell of solidified plastic spacedly surrounding the body portion of said container, distributing a foamable plastic material over the interior surface of said shell and initially spaced from said container while rotating said mold to effect said spaced distributing, and foaming and solidifying said foamable plastic material while continuing said rotating, thereby filling the space between said shell and said container with foamed solidified plastic.

3. A method of forming an insulating jacket around a container, which comprises securing the major portion of a container in spaced relationship within the confines of a larger, rotatable cavity mold adapted to rotate about a shiftable axis, thereby forming an annular space between said mold and said container, depositing a quantity of fluid plastic material in said annular space, rotating said mold and concurrently shifting the axis of rotation thereof to distribute said fluid plastic over the interior surface of said mold, solidifying said plastic material on said surface concurrently with the rotation of said mold to thereby form a shell of solidified plastic spacedly surrounding the major portion of said container, introducing a foamable liquid plastic material into the annular space between said shell and said container, the quantity of foamable plastic so introduced being sufficient to subsequently fill said space with foam, rotating said mold and thereby distributing said foamable plastic over the interior surface of said shell, said rotating effecting distribution of a film of said foamable plastic on the surface of said shell initially spaced from said container, and concurrently foaming and solidifying said foamable material, thereby filling the space between said shell and said container with foamed, solidified plastic.

4. A method of forming an insulating jacket around a container, which comprises securing a major portion of a container in spaced relationship within the confines of a larger, rotatable cavity mold which is adapted to travel in a closed orbital path and to rotate about a shiftable axis, depositing a quantity of fluid plastic material in the space between said mold and said container, advancing said mold through an orbital path, rotating said mold while concurrently shifting said axis of rotation to thereby distribute said plastic material over the surface of said mold, solidifying said plastic material on said mold surface to thereby form a shell of solidified plastic spacedly surrounding the majority of said container, injecting a foamable plastic material into the space between said shell and said container, the quantity of material so injected being sufficient to subsequently fill said space with foam, rotating said mold to initially distribute said foamable plastic or a layer on said shell, initially spaced from said container, foaming and solidifying said foamable material, and continuing rotating said mold until said foaming and solidifying is complete, thereby filling the space between said shell and said container with foamed solidified plastic.

5. A method of forming an insulated container, which comprises nesting the body portion of a container in spaced relationship within the confines of a larger, axially rotatable cavity mold, thereby forming an annular space between said mold and said container, introducing a foamable liquid plastic material into said annular space while rotating said mold to initially form a layer of said plastic on the interior surface of said mold, said layer of plastic being initially spaced from said container, and concurrently foaming and solidifying said foamable plastic, thereby filling the space between said mold and said container with solidified, foamed plastic.

6. A method of forming an insulated container, which comprises nesting the body portion of a container within the confines of a larger, axially rotatable cavity mold having a shiftable axis in rotation, introducing a foamable liquid plastic material between said container and said mold while rotating said mold and shifting the axis of rotation thereof to thereby initially distribute said foamable material over the surface of said mold and initially spaced from said container, foaming and solidifying said foamable material, and continuing said rotation and shifting of the rotational axis thereof until said foaming is completed, thereby filling the space between said mold and said container with foamed, solidified plastic.

References Cited in the file of this patent

UNITED STATES PATENTS

| | | |
|---|---|---|
| 2,221,695 | Robertson | Nov. 12, 1940 |
| 2,337,998 | Karoff | Dec. 28, 1943 |
| 2,376,653 | Boyer | May 22, 1945 |
| 2,409,910 | Stober | Oct. 22, 1946 |
| 2,629,130 | Rempel | Feb. 24, 1953 |
| 2,629,131 | Martin et al. | Feb. 24, 1953 |
| 2,659,107 | De Bell | Nov. 17, 1953 |
| 2,696,024 | Mobley et al. | Dec. 7, 1954 |
| 2,753,642 | Sullivan | July 10, 1956 |
| 2,780,350 | Simon et al. | Feb. 5, 1957 |
| 2,802,766 | Leverenz | Aug. 13, 1957 |
| 2,839,788 | Dembiak | June 24, 1958 |